US012681907B2

(12) United States Patent
Liu et al.

(10) Patent No.: US 12,681,907 B2
(45) Date of Patent: Jul. 14, 2026

(54) TECHNIQUES FOR COMPREHENSIVELY SUPPORTING JSON SCHEMA IN A RDBMS

(71) Applicant: Oracle International Corporation, Redwood Shores, CA (US)

(72) Inventors: Zhen Hua Liu, San Mateo, CA (US); Srikrishnan Suresh, Belmont, CA (US); Beda Christoph Hammerschmidt, Palo Alto, CA (US); Joshua Spiegel, St. Louis, MO (US); Douglas James McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/966,714

(22) Filed: Oct. 14, 2022

(65) Prior Publication Data

US 2024/0126726 A1 Apr. 18, 2024

(51) Int. Cl.
*G06F 16/21* (2019.01)
*G06F 16/2453* (2019.01)
*G06F 16/84* (2019.01)

(52) U.S. Cl.
CPC ...... *G06F 16/212* (2019.01); *G06F 16/24534* (2019.01); *G06F 16/86* (2019.01)

(58) Field of Classification Search
CPC ... G06F 16/212; G06F 16/24534; G06F 16/86
See application file for complete search history.

(56) References Cited

U.S. PATENT DOCUMENTS

| | | | |
|---|---|---|---|
| 7,865,823 B2 | 1/2011 | Matheson | |
| 8,719,270 B2 | 5/2014 | Agarwal | |
| 8,838,626 B2 | 9/2014 | Yu | |
| 9,087,140 B2 | 7/2015 | Chamarthy | |
| 10,437,564 B1 | 10/2019 | Periwal | |
| 10,791,195 B2 | 9/2020 | Chen | |
| 11,423,001 B2 | 8/2022 | Liu et al. | |
| 2004/0006744 A1 | 1/2004 | Jones | |
| 2004/0064466 A1 | 4/2004 | Manikutty | |
| 2009/0006943 A1 | 1/2009 | Matheson | |
| 2013/0185251 A1 | 7/2013 | Garg | |
| 2013/0191509 A1* | 7/2013 | Loughry | G06F 9/541 |
| | | | 709/219 |
| 2014/0067866 A1 | 3/2014 | Chen | |
| 2015/0371018 A1* | 12/2015 | Ahmed | G06F 21/30 |
| | | | 726/17 |

(Continued)

OTHER PUBLICATIONS

DigitalOcean How To Work with JSON in MySQL Sep. 21, 2020. https://www.digitalocean.com/community/tutorials/working-with-json-in-mysql (Year: 2020).*

(Continued)

*Primary Examiner* — Alicia M Willoughby
(74) *Attorney, Agent, or Firm* — Hickman Becker Bingham Ledesma LLP; Marcel K. Bingham

(57) ABSTRACT

JSON schemas are implemented efficiently within a DBMS. Through these techniques, the power and benefit of schema-based paradigm are realized in a more cost-effective manner in terms of computer system performance. JSON schema-based techniques described herein improve execution efficiency of database statements that access JSON objects and improve software development productivity.

24 Claims, 9 Drawing Sheets

(56) References Cited

U.S. PATENT DOCUMENTS

| | | | |
|---|---|---|---|
| 2018/0246984 A1 | 8/2018 | Kamiya | |
| 2019/0102389 A1 * | 4/2019 | Legault | |
| 2019/0188288 A1 * | 6/2019 | Holm ................... | G06F 16/289 |
| 2019/0265982 A1 | 8/2019 | Mickelsson | |
| 2020/0012647 A1 * | 1/2020 | Johnson, III ......... | G06F 16/221 |
| 2023/0222104 A1 | 7/2023 | Filho | |
| 2023/0385133 A1 | 11/2023 | Lasky | |

OTHER PUBLICATIONS

How To Work with JSON in MySQL.*
DigitalOcean How To Work with JSON in MySQL Sep. 21, 2020 and Oct. 24, 2020 https://www.digitalocean.com/community/tutorials/working-with-json-in-mysql (Year: 2020).*
Oracle® Database, "JSON Developer's Guide", 2015, 320 pages.
Liu, Zhen Hua, et al., "JSON Data Management—Supporting Schema-less Development in RDBMS", Sigmod '14, http://dx.doi.org/10.1145/2588555.2595628, Jan. 1, 2014, 12pgs.
Current Claims, in International Application No. PCT/US2023/034900, dated Dec. 15, 2023, 3 pages.
Spoth et al., "Schemadrill: Interactive Semi-Structured Schema Design", Proceedings of the 45th International ACM SIGIR Conference on Research and Development in Information, Jun. 10, 2018, 7 pages.
Wu et al., "A Hybrid Parallel Processing for XML Parsing and Schema Validation." Presented at Ballisage: The Markup Conference 2008, Montreal, Canada, August Dec. 15, 2008.

* cited by examiner

COMPILATION AND EXECUTION WITH REWRITE TO INCLUDE JSON CASTING FUNCTION

JQ5: Select * from MyCollection where json_exists(JOCL, '$?(@.a >= 34)' );
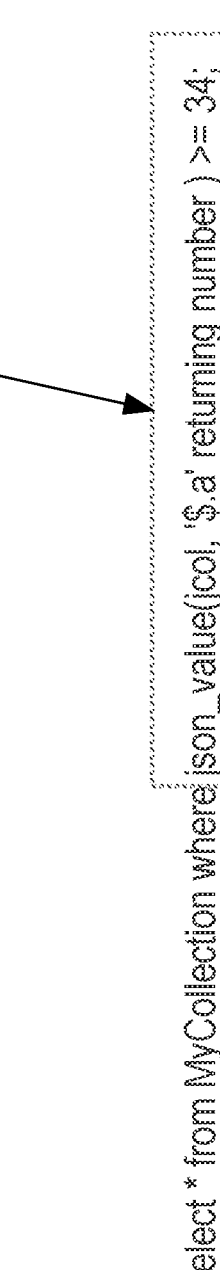
"DBMS examines JSON schema to determine that field "a" is scalar number value to rewrite to equivalent predicate based on the schema and that is computed more efficiently by the DBMS".
JQ5': Select * from MyCollection where json_value(jcol, '$.a' returning number ) >= 34;
FIG. 5

Figure 6:
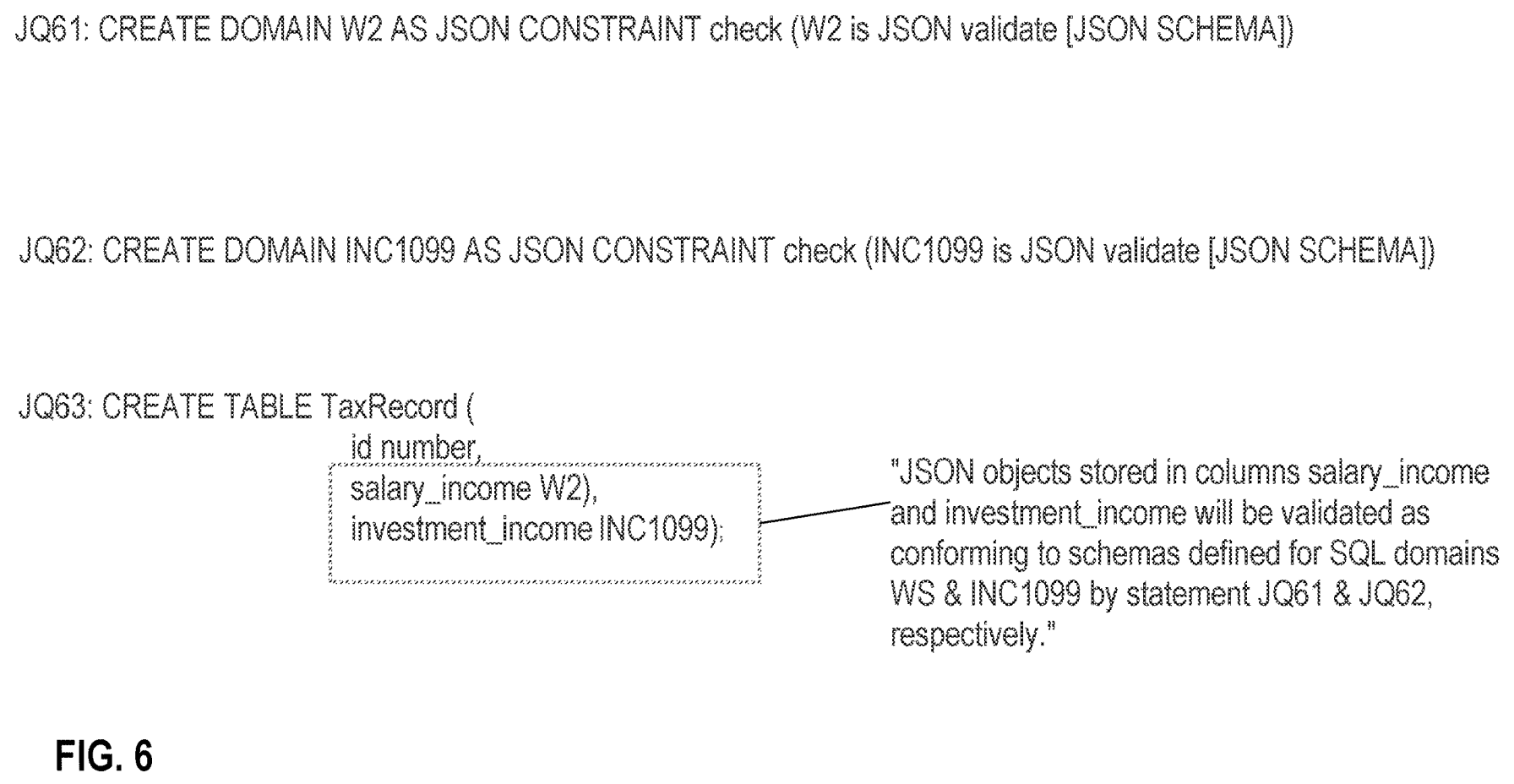

JQ61: CREATE DOMAIN W2 AS JSON CONSTRAINT check (W2 is JSON validate [JSON SCHEMA])

JQ62: CREATE DOMAIN INC1099 AS JSON CONSTRAINT check (INC1099 is JSON validate [JSON SCHEMA])

JQ63: CREATE TABLE TaxRecord (
    id number,
    salary_income W2),
    investment_income INC1099);

"JSON objects stored in columns salary_income and investment_income will be validated as conforming to schemas defined for SQL domains W5 & INC1099 by statement JQ61 & JQ62, respectively."

DDL Statement 700

```
CREATE TABLE customers (
  data JSON,
  check data IS JSON (validate using '
  {
    "type": "object", "properties": {
      "id": {"type": "number"},
      "name": {"type", "string", maxLength": 20},
      "addresses", {"type": "array", "minItems":1,
      "items": {
        "type": "object",
        "properties": {
          "street": {"type": "string", "maxLength": 100},
          "zip": {"type": "string",
                  "maxLength":10}
        }}},
    "required": ["id"]
  }');
```

"Both DDL statements define an array addresses, but DDL statement 710 uses a simplified syntax that does not use key-value pair that explicitly declare an array type and it's items."

DDL Statement 710

```
CREATE TABLE customers (
  data JSON {
    id    number not null,
    name  varchar2(20),
    addresses [
    {
      street  varchar2(100),
      zip     varchar2(10)
    } +
    ]
  }
);
```

"Both DDL statements define a street field, but DDL statement 710 uses a simplified syntax that does not use key-value pairs to declare a string and maximum length."

TECHNIQUES FOR COMPREHENSIVELY SUPPORTING JSON SCHEMA IN A RDBMS

FIELD OF THE INVENTION

The present disclosure relates to storage of JavaScript object notation (JSON) in a database system.

BACKGROUND

JavaScript object notation (JSON) is a lightweight data specification language for formatting "JSON objects". A JSON object comprises a collection of fields, each of which is a field name/value pair. A field name is in effect a tag name for a node in a JSON object. The name of the field is separated by a colon from the field's value.

RDBMS vendors and No-SQL vendors both support JSON functionality to varying degrees. RDBMS vendors in particular support JSON text storage in a varchar or character large object (CLOB) column and apply structured query language (SQL) and/or JSON operators over the JSON text, as is specified by the SQL/JSON standard. A RDBMS may also include a native JSON data type. A column may be defined as a JSON data type and dot notation may be used to refer JSON fields within the column. JSON operators may operate on column having a JSON data type.

Being a minimalist semi-structured data model, JSON is a de-facto standard for schema-less development in database markets. However, the use of schemas remains important. Schema validation may be used to enforce data constraints, enforce business rules, and improve the quality of data. Described herein are approaches that efficiently perform JSON schema validation or that exploit the use of JSON schema in novel ways.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

In the drawings:

FIG. 5 is a diagram depicting a schema-informed rewrite of a database statement according to an embodiment of the present invention.

FIG. 6 is a diagram depicting the use of SQL domains for JSON schemas according to an embodiment of the present invention.

FIG. 7 depicts a simplified JSON schema syntax according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein are techniques that improve the efficiency and capability of supporting schema-based JSON in a DBMS. Through these techniques, the power and benefit of JSON schemas are realized in a more cost-effective manner in terms of computer system performance. The techniques improve, inter alia, the efficiency of validating JSON objects against JSON schemas and the efficiency of executing queries against JSON objects. The techniques also facilitate and simplify software development of JSON in a DBMS.

The techniques are illustrated within the context of a DBMS that supports the relational database model and execution of SQL statements. However, embodiments of the present invention are not necessarily limited to such DBMSs.

Example Computer with Database Management System

Figure 1:
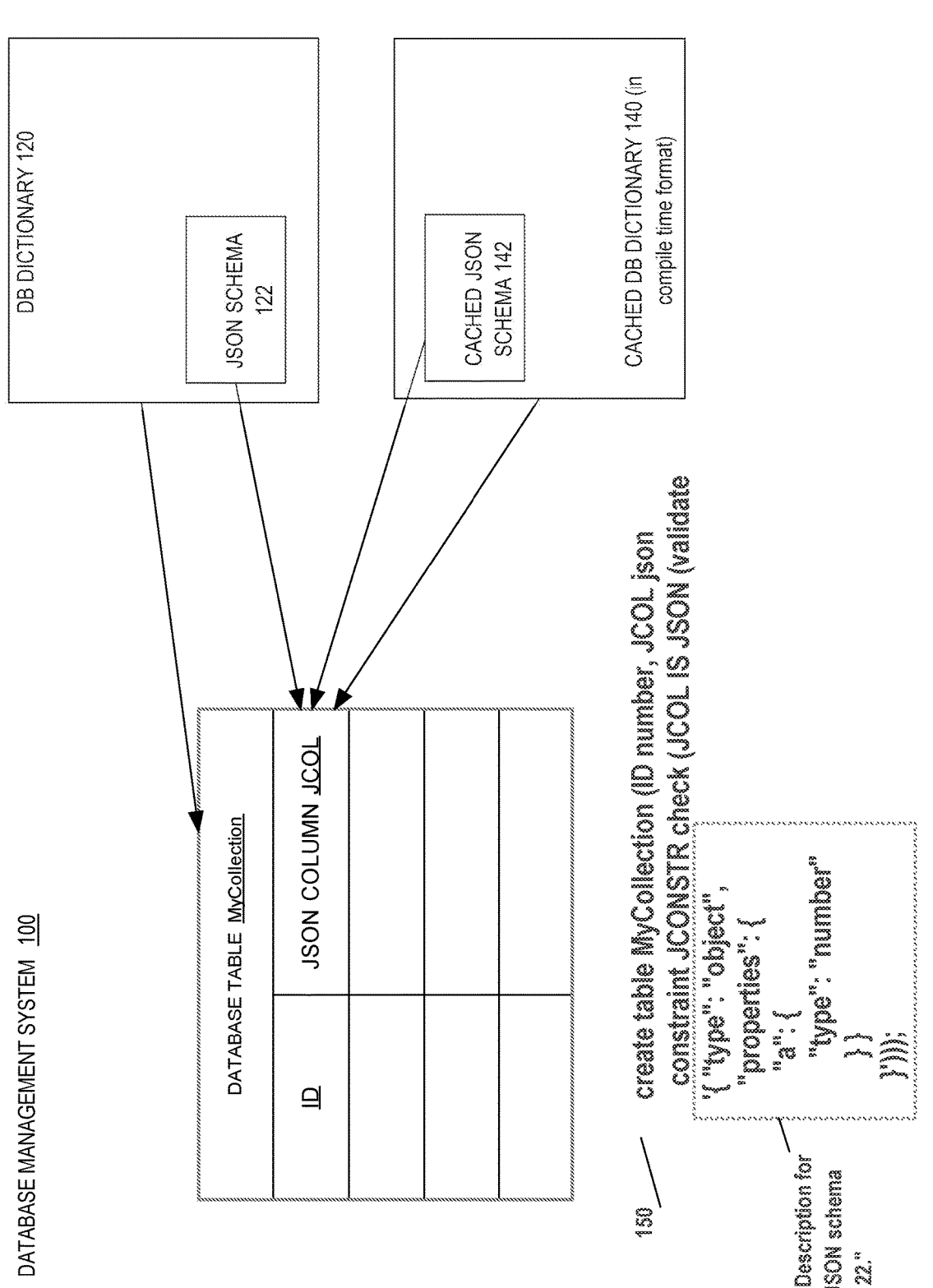
FIG. 1 is a diagram depicting a DBMS that supports management JSON objects and JSON schemas according to an embodiment of the present invention.

FIG. 1 is a block diagram that depicts an example database management system DBMS 100 in an embodiment. DBMS 100 uses dot notation to operate on any column defined by DBMS 100 to have the JSON data type. The JSON data type is native to DBMS 100.

A column defined by a DBMS as having the native JSON data type is referred to herein as a JSON typed column. Similarly, a JSON object that is typed as the JSON native data type is referred to herein as a JSON typed JSON object. A JSON object may be constructed in a way that conforms to JSON but may nevertheless not be typed as the JSON native data type. For example, a JSON object may be a string data type and may be formatted according to JSON but is nevertheless not a JSON typed JSON object.

DBMS 100 is hosted on at least one computer (not shown) such as a blade in a rack server, a personal computer, a mainframe, a virtual computer, or other computing device. Such computer(s) may be interconnected by a communication network (not shown). In an embodiment, DBMS 100 is a relational DBMS (RDBMS).

DBMS 100 contains at least one database (not shown), such as a relational database and/or an object-relational database. The database may contain database table(s) such as database table MyCollection, which is a relational table. MyCollection includes column ID and JSON column JCOL, which is defined by DBMS 100 as a JSON typed column.

Database table MyCollection is defined in database dictionary DB dictionary 120 of DBMS 100. DB dictionary 120 stores metadata about schematic details such as definitions of database tables, table columns, and data types. DB dictionary 120 in particular includes metadata that defines column JCOL as a JSON typed column constrained to JSON schema 122. The DB dictionary 120 also defines JSON schema 122. JSON documents stored in JCOL have been validated by DBMS 100 as complying with JSON schema 122.

Metadata in DB dictionary 120 is cached in volatile memory as cached DB dictionary 140. Cached DB dictionary 140 provides quicker access to metadata than from DB dictionary 120 to various database processes that use the metadata. The quicker access is not only accelerated by caching the metadata in lower latency volatile memory, but also by storing the metadata in a compile-time format that is organized for more efficient access by database processes that use the metadata to perform such operations as compilation and JSON schema validation.

Various operations described herein entail obtaining information from DB dictionary 120, operations such as accessing, reading or examining DB dictionary 120. In general, such operations should be understood as attempting to access the information in Cached DB dictionary 140 before directly accessing DB dictionary 120 for the information.

Cached DB dictionary 140 includes cached JSON schema 142, a cached version of JSON schema 122 in cached DB dictionary 140. According to an embodiment, the compile-time format for a JSON schema is organized in a hierarchical tree structure comprising hierarchically linked nodes that mirror the hierarchy of a JSON schema. Each of the nodes corresponds to either a field, array, or object and a respective data type if applicable. The tree structure enables efficient navigation of the compile-time format during JSON schema validation.

DB dictionary 120 may be modified by executing a data definition language (DDL) statement to create or modify definitions of database objects, which include creating and/ or modifying a JSON schema. DDL statement 150 is issued to define table MyCollection and a JSON schema for JCOL in table MyCollection. DDL statement 150 declares table MyCollection and columns of MyCollection, which include scalar column ID and column JCOL.

According to an embodiment, a JSON schema is defined by defining a column constraint that describes the JSON schema. The definition of the constraint also defines the JSON schema on the column.

Referring to FIG. 1, DDL statement 150 defines column constraint JCONSTR, which describes JSON schema 122 according to a JSON schema syntax. When DBMS 100 executes a DML (data manipulation language) command to insert or update a JSON object in JCOL, the constraint JSCONSTR is invoked to determine whether the insert or update results in a valid JSON object that conforms to JSON schema 122. If not, DBMS 100 prevents the insert or update.

An example of a JSON schema syntax is the JSON schema standard promulgated by the Internet Engineering Task Force standards body in, for example, RFC 8927. Various JSON schema syntaxes that are supported by any particular DBMS may be the same as this standard, be a slight variation of the standard, or be very different from the standard, such as the simplified syntax described later herein.

Viewing a JSON Schema

DBMS 100 generates output describing a schema for relational tables or other database objects using the DDL command DESCRIBE. However, the particular output that describes the column may describe the column's name, data type, or name of any constraint. However, the details of the constraints are not output. Thus, when outputting a table having a JSON typed column for which a JSON schema is defined as a constraint, details like the JSON schema are not output.

To facilitate the viewing of a JSON schema, DBMS 100 is configured to provide a function to invoke that generates a description of a JSON schema. The function takes as an argument a JSON typed column.

JSON Storage Formats

A JSON typed object is stored in one or more data type storage formats that are particular to the native JSON data type. There may be a separate data type storage format that is used for byte addressable memory and/or used for block-based memory such as disk. For example, a data type storage format used for byte addressable memory may be an in-memory tree representation of a JSON object that is similar to the document object model (DOM) used for Extended Mark-up Language (XML) documents. As another example, a data type storage format used for block-based memory is a serialized compressed form that is used for persistently storing a JSON object in a JSON typed column of a database table.

A data type storage format may be used for both byte-addressable memory and block-based memory. An example of such a data type storage format is OSON (Oracle™ JSON). The OSON format encodes strings and other forms of values according to a local dictionary stored in the JSON object and includes encoded mappings and offsets that represent the hierarchical relations between the fields of the JSON object. The format not only compresses a JSON document but enables efficient navigation of the JSON object to facilitate evaluation of path expressions against the JSON object. Because OSON provides both of these advantages, it is used for byte-addressable memory and block-based memory.

In an embodiment, the OSON format includes embedded metadata defining a JSON schema. The embedded metadata may be in a compile-time format or other similar format. A JSON schema defined by embedded metadata in a JSON object is referred to as an embedded JSON schema. An embedded JSON schema makes a JSON object self-describing, that is, the JSON schema is stored in the JSON object itself. An embedded schema avoids the need to access a source of the JSON schema that is external to the JSON object, such as DB dictionary 120.

Example implementations of OSON are described in (1) U.S. Pat. No. 10,262,012, Techniques Related to Binary Encoding of JSON documents to Support Efficient Path Navigation of the JSON documents, which is incorporated herein by reference in entirety, and (2) Closing the Functional and Performance Gap Between SQL and NoSQL, SIGMOD '16, which is incorporated herein by reference in entirety.

JSON operators supported by DBMS 100 are configured to return as output a JSON typed JSON object in a serialized compressed form such as OSON. For example, JSON_QUERY is an operator that returns one or more specified JSON values in a JSON object. The returned data type of the values is overloaded and can be a character string data type or JSON type JSON object represented in OSON. When DBMS 100 detects that the output of the JSON_QUERY operator is assigned to or is to be stored in a JSON typed column, the returned data type is a JSON typed JSON object represented in the OSON format. For example, when DBMS 100 executes the following database statement JQA, DBMS 100 returns a JSON typed JSON object in the OSON format as output for the JSON_QUERY operator because the DBMS detects that the output is assigned to JSON column JCOL.

JQA:update mycollection set JCOL=json_query (jcol, . . . .);

Type Casting & Operators that Return JSON Typed Objects

The process of generating a JSON typed JSON object from a source JSON object that is not JSON typed (e.g. a string formatted according to JSON) is referred to as JSON type casting or herein as simply type casting. Generating the JSON typed JSON object entails data type storage format conversion, which entails examining the data type storage format of the data type of the source JSON object to generate a JSON data type storage format representation of the JSON object being type casted. According to an embodiment, DBMS 100 supports a type casting operator JSON( ), which takes as input a JSON object having a non-JSON data type and returns the JSON type object. JSON( ) is configured to perform data type storage format conversion needed for type casting.

Validating JSON

In general, JSON schema validation entails traversing the fields of a JSON object and determining whether the field is described by the JSON schema at the path prescribed by the JSON schema and that the data type of the field's value complies with the JSON schema. A JSON document may be traversed in several ways.

A materialized tree representation may be first generated. The tree representation comprises nodes that represent fields. The nodes in the tree representation are traversed. When arriving at a node representing a field, the field is checked against the JSON schema to determine whether the field is described by the JSON schema at the path prescribed by the JSON schema. The value of the field is checked to determine whether the value complies with the data type that the JSON schema requires for the field.

Another approach is the streaming approach. A streaming parser parses a JSON object and returns events that represent traversals through fields of the JSON document. A DBMS in effect traverses the JSON document by tracking the events that represent traversals and deriving the path arrived at when receiving an event for a particular field. The value of the field is checked to determine that the value complies with the data type the JSON schema requires for the field.

Validation Coincident with Storage Format Generation

Data type storage format may entail traversing a JSON object represented in a non-JSON data type, such as a string. The JSON object is traversed in a way similar to the way the JSON object would be traversed to validate the JSON object. Under a "coincident validation" approach, the operations performed to validate a JSON object can be performed while traversing a JSON document to form the JSON storage format or to perform another type of JSON operation. Once the JSON operation is commenced and traversal of the JSON object leads to a field that is found to be undefined by a JSON schema at the path traversed to, or the value of the field does not comply with the data type defined for the field by the JSON schema, the JSON operation is ceased and an error is generated.

The term "coincident validation" refers to performing JSON schema validation coincidently with another JSON operation. JSON operators perform specific JSON operations, and may be configured for coincident validation depending on the specific operation performed.

A general scenario for performing coincident validation occurs when DBMS 100 detects that a JSON operator should conform with a JSON schema defined by DB dictionary 120. For example, DBMS 100 detects that the output of a JSON operator should conform with a JSON schema defined by DB dictionary 120 when DBMS 100 receives a database statement that assigns the output of the JSON operator to a JSON column constrained to the JSON schema, such as database statement JQA. Such detection entails examining DB dictionary 120 for a constraint that constrains the JSON column to a JSON schema.

A more specific scenario for coincident validation involves a JSON casting operator. JSON casting operators may be used to rewrite database statements that assign a non-JASON typed SQL_expression to a JSON typed column, where the non-JSON data type may be a string or character data type value constructed as a JSON object. When a DBMS compiles such a database statement, the DBMS casts the SQL expression as a JSON type JSON object by, in effect, rewriting the database statement to include a JSON casting operator that takes as input the SQL expression. The following database statement JQB and JQB' is used to illustrate such a rewrite:

> JQB: insert into mycollection(1, <SQL_expression>);
> JQB':insert into mycollection(1, JSON(<SQL_expression>);

SQL_expression is a non-JSON typed expression. Database statement JQB is rewritten to JQB' to type cast SQL_expression using the JSON casting operator JSON( ) To illustrate advantages of coincident validation, DBMS 100's performance of data type storage format conversion and schema validation for JSON( ) in JQB' is first described without coincident validation and then with coincident validation.

To insert a JSON object that is represented by SQL_expression, DBMS 100 first type casts the JSON object, which entails performing data type storage format conversion to generate a JSON typed JSON object in a storage format for the JSON data type. After data type storage format conversion is completed, DBMS 100 executes the JSON schema constraint defined for JCOL, causing DBMS 100 to perform JSON validation of the JSON object against JSON schema 122. If the JSON object does not conform to the JSON schema, a schema violation error in the form of a constraint violation occurs and DBMS 100 prevents the insertion of the JSON object into MyCollection. As a consequence, DBMS 100 has completely performed the process of storage format conversion before DBMS determines that it cannot insert the JSON object anyway because of the schema violation.

To exploit coincident schema validation, the JSON typecasting function JSON( ) is configured to perform coincident schema validation when a JSON schema is passed in as a function argument. Specifically, when DBMS 100 compiles the database statement, it detects that a JSON schema is defined for JCOL. When DBMS 100 rewrites the database statement to include the JSON casting operator JSON( ) for SQL_expression, DBMS 100 includes the JSON schema as an input argument. The JSON schema is used by the JSON ( ) casting operator to perform coincident schema validation with data type storage format conversion. Rewriting a database statement by adding or modifying an operator to perform coincident validation is referred to herein as schema validation pushdown. Schema validation pushdown may involve passing in a JSON schema as an input argument.

Figure 2:
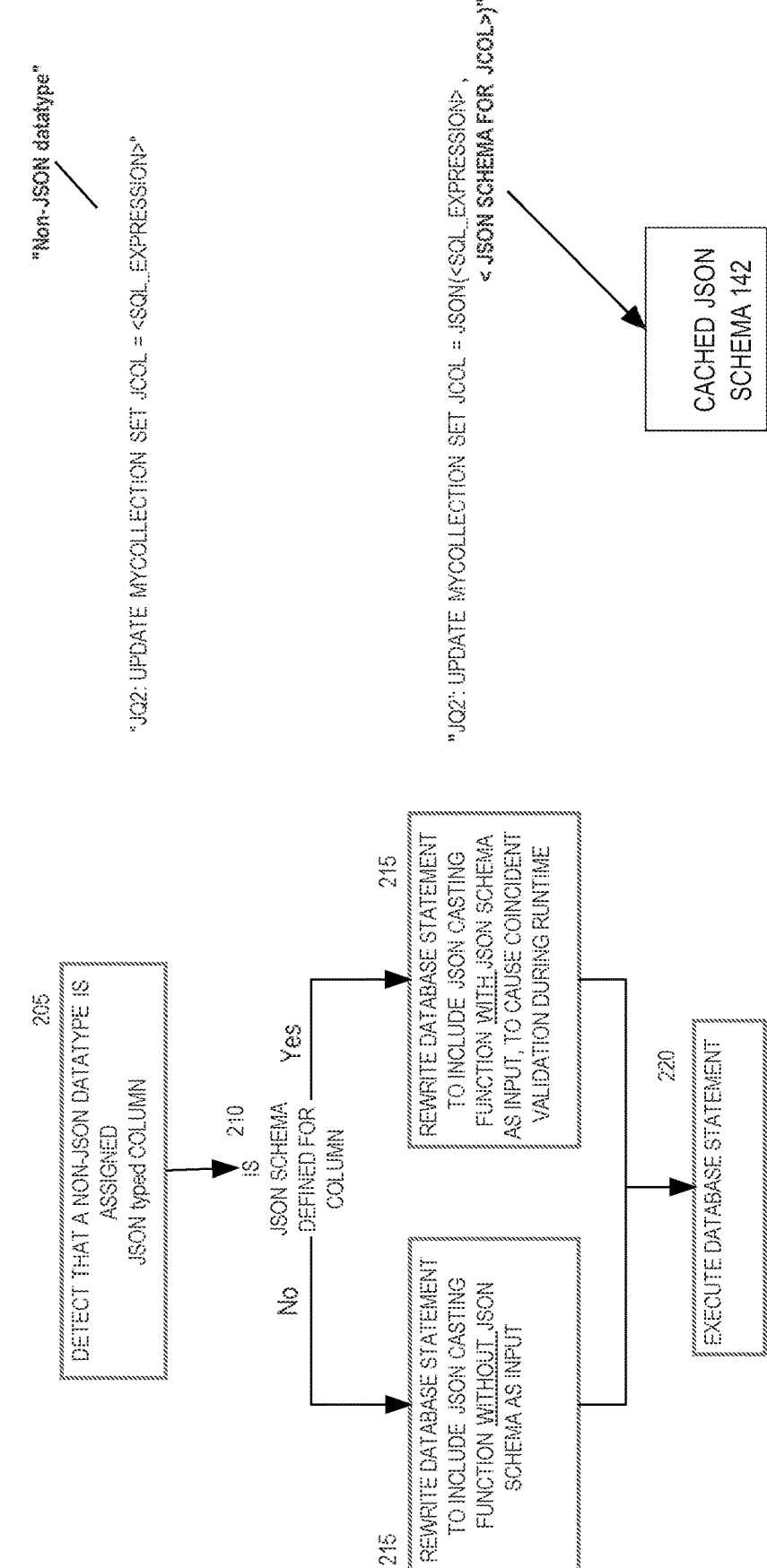
FIG. 2 is a diagram depicting operations performed for coincident validation and type casting according to an embodiment of the present invention.

FIG. 2 is a diagram depicting a procedure for rewriting a database statement to perform schema validation pushdown. The procedure is depicted using database statement JQ2 shown in FIG. 2, which is being compiled for execution by DBMS 100. The procedure is one of many more operations that are performed to compile and execute a database statement but that are not depicted in FIG. 2.

Referring to FIG. 2, DBMS 100 detects that the database statement being compiled assigns a non-JSON type SQL_expression to a JSON column. (205). In the current illustration, DBMS 100 detects that a database statement, which is an update statement, is assigning a non-JSON data type SQL_expression to JCOL in MyCollection.

Next, DBMS 100 determines whether a JSON schema is defined for the JSON column. (210) If a JSON schema is not defined, then the database statement is rewritten to include a JSON( ) without schema validation pushdown, i.e. no JSON schema is passed in as an input argument. If a JSON schema is defined for the JSON column, then schema validation pushdown is performed by rewriting the database statement to include the JSON casting operator with an input argument referring to the JSON schema.

In the current example, DBMS 100 determines whether a JSON schema is defined for JCOL by examining metadata defining JCOL in DB dictionary 120. Based on the examination, DBMS determines that JCOL is constrained by JSON schema 122; therefore a JSON schema is defined for JCOL. In response to making this determination, DBMS 100 rewrites JQ2 to JQ2'. JQ2' includes the JSON casting operator JCOL( ) that takes, as input arguments, SQL_expression and the JSON Schema for JCOL. The input argument for the JSON schema for JCOL may be a reference to cached JSON schema 142, which is in compile time form.

According to an embodiment, once JSON( ) returns a schema validated JSON typed JSON object, DBMS 100 records the schema validity in a flag in memory. Later, DBMS 100 executes the JSON schema constraint validation and invokes the ISJSON( ) operator to perform schema validation. The ISJSON( ) operator is configured to check for this flag. This causes DBMS 100 to detect that the flag indicates that the JSON object has been schema validated. In response, DBMS 100 foregoes further schema validation by forgoing invoking ISJSON( ).

Generalized Schema Pushdown & Piecewise Schema Validation

Schema validation pushdown may be applied to JSON operators more generally, particular JSON manipulation operators, which are operators that in effect modify specific fields within a JSON object. Generally, a JSON manipulation operator includes the following input arguments. First is an input argument for a JSON object to modify. Second is one or more arguments that specify a modification operation and target within the input JSON to which apply the modification operation. A target is specified using a path expression. Schema validation pushdown may be applied to a JSON manipulation operator so that schema validation is performed by the operator to ensure the input JSON document as modified or created conforms to the JSON schema.

JSON manipulation operators are configured to modify a portion of an input JSON object. If the input JSON object already conforms to JSON schema, then validation may be limited to portions of the JSON object whose compliance with the JSON schema could be affected. The entirety of the JSON object need not be checked and validated. "Piecewise schema validation" is schema validation that is limited to portions of the JSON object whose compliance with a JSON schema could be affected by one or more changes to a JSON object. Piecewise schema validation of a JSON object generally consumes fewer computer resources (e.g. processor time and memory) than schema validation of the entire JSON object.

Figure 3:
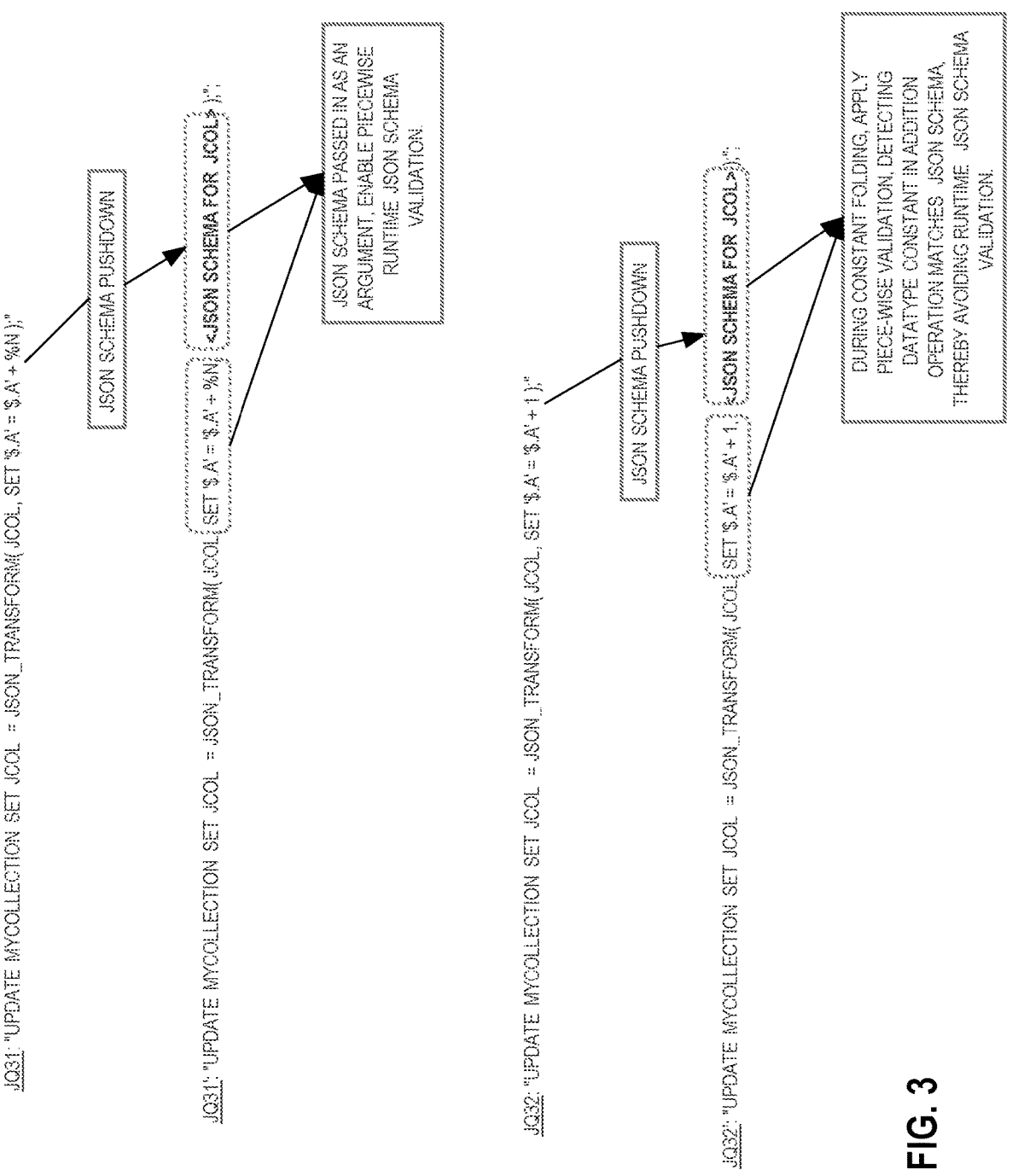
FIG. 3 is a diagram depicting operations performed for coincident partial schema validation according to an embodiment of the present invention.

FIG. 3 is a diagram that depicts a schema validation pushdown performed for a JSON manipulation operator included in a database statement. Referring to FIG. 3, database statement JQ31 is an update database statement specifying an update column JCOL. JQ31 assigns the output of the JSON manipulation operator JSON_TRANSFORM to JCOL, and takes JCOL as the input argument for the input JSON object. The JSON_TRANSFORM operator takes as the input argument for the manipulation operation SET '$.A'='$.A'+% N, which specifies to set the value of target $.A to the current value plus the value of the bind variable % N. The target is expressed as the path expression $.A.

When DBMS 100 compiles JQ31, DBMS 100 determines that JSON schema 122 constrains JCOL by examining the metadata defining JCOL in DB dictionary 120. DBMS performs schema validation pushdown by rewriting JQ31 to JQ31', which includes the JSON_TRANSFORM rewritten to include an input argument for the JSON schema for JCOL. When executing JQ31' after compilation, DBMS performs coincident piecewise schema validation after changing a JSON object as specified by the manipulation operation for the JSON_TRANSFORM operator.

Compile Time Schema Validation

A type of compilation optimization is constant folding. Constant folding recognizes and evaluates constant expressions at compile time rather than performing the evaluation at runtime. In an embodiment, when DBMS 100 determines that manipulation operations specified by a JSON manipulation operation apply only constants, then schema validation may be performed at compile time for the JSON manipulation operation rather than at runtime.

Referring to FIG. 3, database statement JQ32 is an example of a database statement for which compile-time schema validation may be performed. Like JQ31, database statement JQ32 is an update database statement updating column JCOL by assigning the output of JSON_TRANSFORM to JCOL. In JQ32, however, the manipulation operation SET '$.A'='$.A'+1 applies the constant 1 rather than the bind variable % N.

At compile time, DBMS 100 performs piecewise schema validation. DBMS 100 determines that the data type of $.A is a number which matches the data type of the constant 1. Therefore, at runtime the manipulation operation must always update $.A to a value that conforms with the data type specified by JSON schema 122. DBMS 100 forgoes schema validation at runtime when executing the JSON_TRANSFORM in JQ32.

Augmentation by Native Data Types

The range of native data types supported by DBMSs may be greater and more robust than that supported by a JSON schema standard. For example, DBMS 100 supports a date-time data type for which there is no analogous data type in the JSON schema standard. Date-time values stored using the JSON schema standard are simply stored as a string describing a date and/or time.

Figure 4:
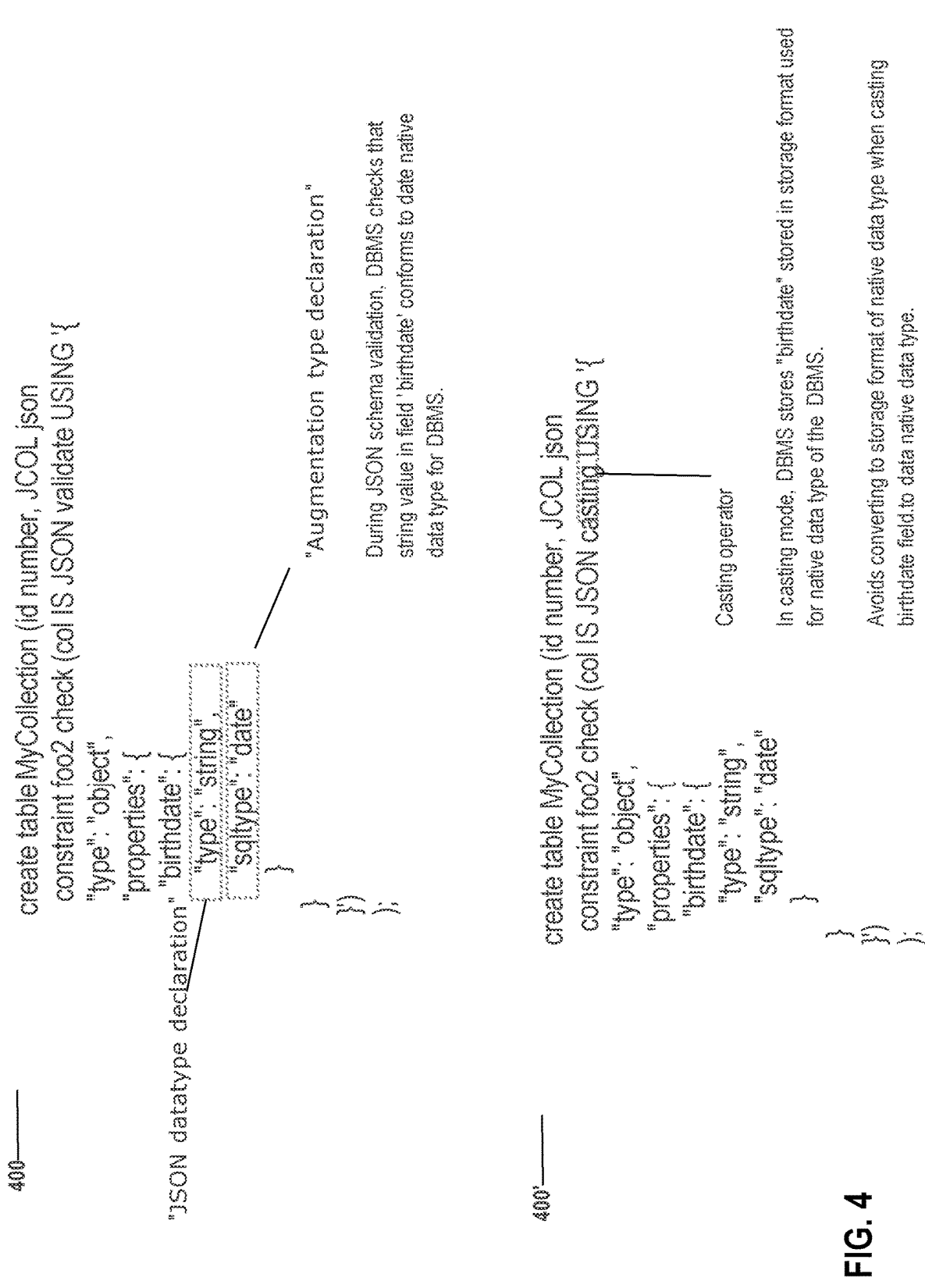
FIG. 4 is a diagram illustrating augmenting JSON standard data types with database data types according to an embodiment of the present invention.

According to an embodiment, a JSON standard data type defined for a JSON field or array by a JSON schema standard may be augmented by a native data type of the DBMS. The augmentation is referred to herein as an augmentation type. FIG. 4 illustrates augmentation types.

Referring to FIG. 4, it depicts DDL statement 400. DDL statement 400 declares a JSON schema for JSON column JCOL. The JSON schema includes a JSON data type declaration that defines the field birthdate as having the JSON data type string. In addition, the JSON schema includes an augmentation type declaration that defines an augmentation type date. Date is a native data type supported by DBMS 100.

During JSON schema validation of a JSON object to store in JCOL, DBMS 100 checks whether the field value of birthdate conforms to the native data type date.

According to an embodiment, a JSON schema may be defined in a "casting mode", which causes values of JSON fields that are defined with an augmentation type to be stored in the storage format of the respective native data type. DDL statement 400' illustrates a JSON schema defined in casting mode.

DDL statement 400' is the same DDL statement 400 except that DDL statement 400 includes a casting operator rather than the validate operand. As before, during JSON schema validation of a JSON object to store in JCOL, DBMS 100 checks whether the field value of birthdate conforms to the native data type date. However, because the JSON schema is defined in the casting mode, the value of birthdate is stored within the JSON object in the data type storage format of the native data type date.

Storing a JSON object field in casting mode has various advantages. A storage format of a native data type may require less storage than storing a string value for the field. Also, data type storage format conversion to type cast field values from a JSON object may be avoided. For example, a database statement may assign a JSON string field from JSON objects to a variable having the native data type date or to a column having the native data type date. If an augmentation type is defined for the JSON string field by a JSON schema in the casting mode, there is no need to perform data type storage conversion because the field value is already stored in the storage format of the native data type. Statement JQC below is an example of avoiding casting conversion.

> JQC: select json_value(jcol, "$.birthdate" returning date)
>     from mycollection Because the field birthdate is already stored in the data type storage format of the native data type date, no data type storage conversion is performed to return birthdate on the date data type for the return value of JSON_VALUE( ).

Schema-Informed Rewrites

Because of the availability of JSON schemas for JSON columns in DBMS 100, DBMS 100 uses information in JSON schemas to rewrite queries referencing JSON columns and data objects into a different but semantically equivalent query that may be executed more efficiently. Queries are semantically equivalent when the queries return equivalent results. JQ5 in FIG. 5 illustrates a query rewrite based on a JSON schema.

The JSON_EXISTS operator in JQ5 is evaluated against rows in MyCollection. For each row, if the JSON object contained in JCOL contains a value that matches the filter path expression ?(@.a>=34), then the operator returns TRUE; otherwise FALSE is returned.

However, when DBMS 100 compiles JQ5, DBMS 100 examines the JSON schema for JCOL to determine that field a is a scalar value defined as a NUMBER. Based on this determination, DBMS 100 determines it can rewrite the JSON_EXISTS operator in JQ5 by replacing the JSON_EX-ISTS operator with an equivalent predicate that uses the JSON_VALUE operator and that can be executed more efficiently, the equivalent predicate being json_value (j col, '$.a' returning number)>=34. Thus, DBMS 100 rewrites JQ5 into the semantically equivalent query JQ5'.

The equivalent predicate is more efficient to execute for several reasons. First, JSON_VALUE is a JSON operator implemented on the assumption that the input path expression argument should resolve to a scalar field. According to the JSON schema, $.a must refer to a scalar field number. On the other hand, JSON_EXISTS requires evaluation of a more general form of an input path expression argument that may refer to non-scalar values such as an object or array. Being configured for the possibility that the input path expression argument may evaluate to an object or array rather than just a scalar field makes the JSON_EXISTS more computationally expensive.

Another reason the equivalent predicate in JQ5' is more efficient to evaluate is that the returning number clause in the JSON_VALUE operator casts the return value of the JSON_ VALUE operator as the native NUMBER data type. The DBMS 100 is able to evaluate natively typed numbers more efficiently.

SQL Domains

In an embodiment, DBMS 100 is enabled to a define a SQL domain that constraints a JSON data type to a particular JSON schema. A SQL domain is user defined data type that specifies a constraint on a native data type. Database object attributes, such as a table column, may be declared as having a data type that is a SQL domain. Typically, a SQL domain constrains the value domain of a native data type. For example, a SQL domain may constrain a NUMBER data type to positive numbers. The following DDL statements JQDA and JQDB are provided to illustrate SQL domains.

```
JQDA: CREATE DOMAIN CPI_DATA AS REAL CHECK (value >=
0 AND
    value <= 10)
JQDB: CREATE TABLE student(
    sid char(9) PRIMARY KEY,
    name varchar(30) ,
    cpi CPI_DATA
);
```

DDL statement JQDA declares domain CPI_DATA_as a native data type REAL that is constrained between the values of 0 and 10 inclusively. DDL statement JQDB declares a column CPI having the domain CPI_DATA_as a data type.

According to an embodiment, a SQL domain may be used to constrain the native JSON data type to a JSON schema. For JSON schemas that are used for multiple columns, use of a SQL domain avoids the need to include complicated text required to describe a JSON schema in each of the DDL statements used to define the columns.

FIG. 6 shows DDL statements that define a JSON data type based on SQL domains and define columns declared as SQL domains. Referring to FIG. 6, JQ61 and JQ62 are DDL statements that define SQL domains used to define JSON schemas for JSON typed columns. JQ61 defines a SQL domain W2 that constrains a JSON data type to a JSON schema for wages subject to a W2 form. JQ62 defines a SQL domain INC1099 that constrains a JSON data type to a JSON schema for income subject to a 1099 form.

DDL statement JQ63 defines a table using these SQL domains. JQ63 creates a table TaxRecord having a column salary_income defined as the SQL domain W2 and a column investment_income defined as the SQL domain INC1099.

Simplified Schema Syntax

A JSON schema can be written in a syntax that conforms to a standard syntax promulgated by the Internet Engineer-ing Task Force in, for example, RFC 8927. The syntax can be quite intricate and tedious to manually write and read. In general, the syntax uses key-value pairs for each particular property of a field defined by a JSON schema, the keys and values each being strings that must be enclosed in quotes. According to an embodiment, a simplified syntax may be used that is similar to a syntax used to define Abstract Data Types and Classes in a database language, such as SQL.

FIG. 7 is diagram depicting a JSON schema code in a standard syntax and in a simplified syntax. DDL statement 700 uses more intricate JSON standard text to define a JSON schema while DDL statement 710 uses a simplified syntax to describe the same schema.

DDL statement 700 uses key-value strings to describe various properties of the fields in the JSON schema, which are much more intricate than constructs used by DDL statement 710. For example, to declare the array addresses, DDL statement 700 includes the key-value pairs "type": "array" and "item"—{List of fields}. {List of fields} is a value containing key-value properties for the fields in each element of the array. On other hand, DDL statement 710 uses only a beginning and ending bracket to declare an array. The brackets surround a list of fields in each element. As another example, DDL statement 700 declares the field street and specifies its properties using key value pairs "type": "string" and "maxLength": 100. DDL statement 710 declares the same properties without using key-value pairs for each property of the field; instead, uses an expression in simplified syntax, i.e. varchar2(100).

Compile Time Json Schema Checking

Developers often write SQL/JSON database statements such as queries that contain mistakes regarding a JSON schema but that are legal statements that are compiled without error. Such mistakes include mistyped JSON field names or references to field names that do not exist in JSON objects. The mistakes may occur in a column-dot notation used for a JSON type column or in a path expression that is an argument to a JSON function. The mistakes are not encountered until the mistakes cause errors at runtime when running the query. Often, the error messages generated for errors are not informative about the mistake.

According to an embodiment, JSON "schema-determinable" errors are found during compile-time and specific error information about the errors is generated. Schema-determinable errors are errors in database statements that may be determined by reference to a JSON schema when compiling database statements. A list of schema-determinable errors is below.

Miss-spelling of a field name in column dot notation or in path expression argument of JSON function.

Casting a JSON value into in incompatible type domain.

A path operation that treats an array as a singleton

Using JSON_VALUE when JSON_EXISTS should be used.

When DBMS 100 detects that a JSON type column referenced in a query has a defined JSON schema, DBMS 100 checks for schema-determinable errors during run-time and reports specifics about the schema-determinable errors. According to an embodiment, compile-time checking for schema-determinable errors can be enabled or disabled by setting a database session attribute.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as rows, and the attributes are referred to as columns. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however the hierarchically-marked data objects are contained in a column of a row, such as a JSON typed column.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, views, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database statement requesting a change, such as a DML statement requesting an update, insert of a row, or delete of a row or a CRUD object method invocation requesting to create, update or delete a document. DML statements or commands refer to statements that specify to change data, such as INSERT and UPDATE statement. A DML statement or command does not refer to a statement that merely queries database data. Committing a transaction refers to making the changes for a transaction permanent.

Under transaction processing, all the changes for a transaction are made atomically. When a transaction is committed, either all changes are committed, or the transaction is rolled back.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase and the commit phase. In the prepare-to-commit phase, branch transaction is prepared in each of the participating database systems. When a branch transaction is prepared on a DBMS, the database is in "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes that provide services and/or perform functions on behalf of entire database server. Such database server system processes include listeners, garbage collectors, log writers, and recovery processes.

A multi-node database management system is made up of interconnected nodes each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and data types of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native date types. Native data types do not have to be defined by a database dictionary to be recognized as a valid data type and to be processed by a DBMS in database statements. In general, database software of a DBMS is programmed to recognize and process native data types without configuring the DBMS to do so, by for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
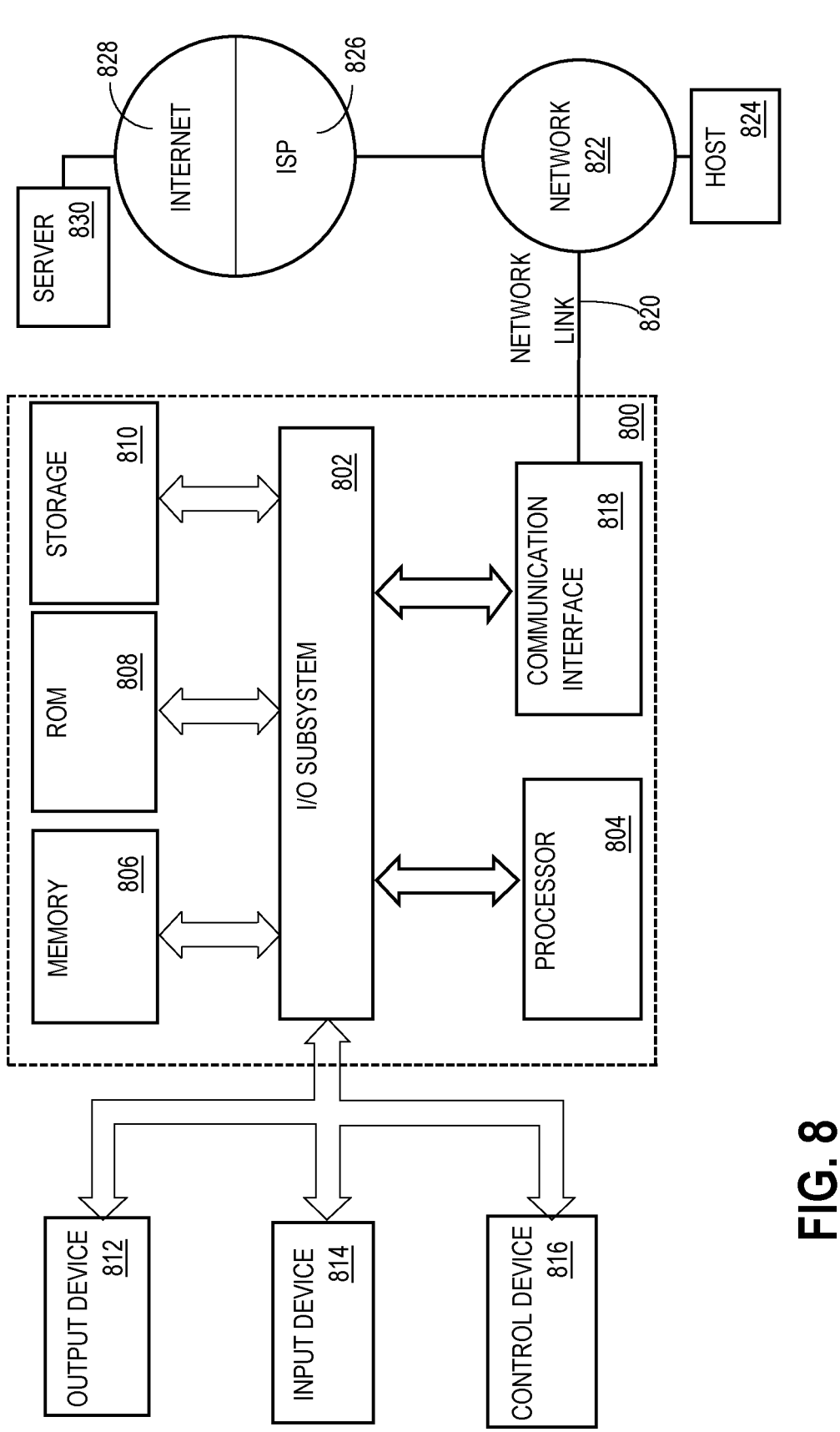
FIG. 8 is a diagram depicting a computer system that may be used to implement an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
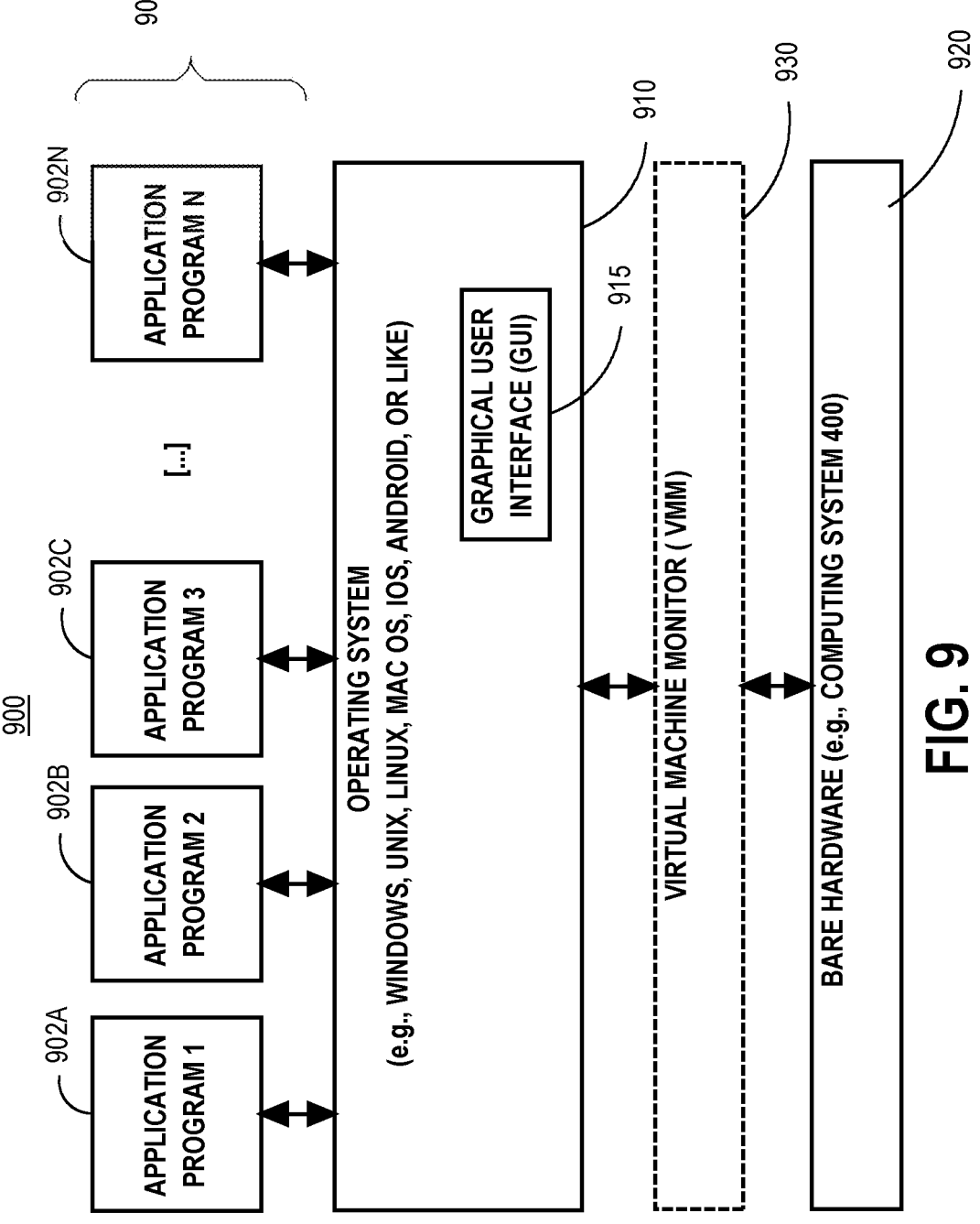
FIG. 9 depicts a software system that may be employed for controlling the operation.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 1106 and on fixed storage (e.g., hard disk or flash memory) 1110, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 1110 into memory 1106) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 1104) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
a database management system (DBMS) receiving one or more data definition language (DDL) statements defining a JavaScript Object Notation (JSON) schema for a JSON column of a database table, said JSON schema defining a plurality of JSON fields for a JSON object, and said JSON schema declaring a first field of said plurality of JSON fields as a native database data type of said DBMS, wherein said native database data type is assignable to columns of database tables of said DBMS, and said native database data type is recognized as a valid data type of the DBMS without the native database data type being defined in a database dictionary of the DBMS;
said DBMS receiving a first data manipulation language (DML) statement specifying to insert a particular JSON object into said JSON column; and
in response to receiving the first DML statement:
determining that a field value for said first field in said particular JSON object conforms to said native database data type; and
inserting said particular JSON object in said JSON column.

2. The method of claim 1, the method further including storing said field value in said particular JSON object in a data type storage format of said native database data type.

3. The method of claim 2, wherein said JSON schema specifies to store said field value in the data type storage format of said native database data type.

4. The method of claim 1, wherein the method further includes rewriting said first DML statement based on said JSON schema.

5. The method of claim 4, wherein rewriting said first DML statement includes replacing an existing JSON operator with said JSON operator.

6. The method of claim 1, wherein the method further includes compiling said first DML statement.

7. The method of claim 1, wherein compiling said first DML statement includes detecting that the JSON schema is defined for the JSON column.

8. The method of claim 1, wherein compiling said first DML statement includes determining that said first DML statement specifies changes that comply with said JSON schema.

9. The method of claim 1, wherein the method further includes compiling said first DML statement, wherein compiling said first DML statement includes detecting schema-determinable errors either in a path expression or dot notation.

10. The method of claim 1, wherein said one or more DDL statements include no key value-pairs specifying properties of any fields of said JSON schema.

11. The method of claim 1, wherein said JSON schema declares a field of said JSON schema as a SQL domain type, wherein the method further includes receiving a DDL statement defining said SQL domain type based on a native data type.

12. The method of claim 1, the method further including:
said DBMS receiving an invocation of a function that requests a description of said JSON schema for said JSON column; and
in response to said DBMS receiving an invocation of a function, generating output describing said JSON schema.

13. One or more non-transitory storage media storing instructions that, when executed by one or more computing devices, cause performance of:
a database management system (DBMS) receiving one or more data definition language (DDL) statements defining a JavaScript Object Notation (JSON) schema for a JSON column of a database table, said JSON schema defining a plurality of JSON fields for a JSON object, and said JSON schema declaring a first field of said plurality of JSON fields as a native database data type of said DBMS, wherein said native database data type is assignable to columns of database tables of said DBMS, and said native database data type is recognized as a valid data type of the DBMS without the native database data type being defined in a database dictionary of the DBMS;
said DBMS receiving a first data manipulation language (DML) statement specifying to insert a particular JSON object into said JSON column; and
in response to receiving the first DML statement:
determining that a field value for said first field in said particular JSON object conforms to said native database data type; and
inserting said particular JSON object in said JSON column.

14. The one or more non-transitory storage media of claim 13, the instructions further including instructions that, when executed by one or more computing devices, cause performance of storing said field value in said particular JSON object in a data type storage format of said native database data type.

15. The one or more non-transitory storage media of claim 14, wherein said JSON schema specifies to store said field value in the data type storage format of said native database data type.

16. The one or more non-transitory storage media of claim 13, wherein the instructions further including instructions that, when executed by one or more computing devices, cause performance of rewriting said first DML statement based on said JSON schema.

17. The one or more non-transitory storage media of claim 16, wherein rewriting said first DML statement includes replacing an existing JSON operator with said JSON operator.

18. The one or more non-transitory storage media of claim 13, the instructions further including instructions that, when executed by one or more computing devices, cause performance of compiling said first DML statement.

19. The one or more non-transitory storage media of claim 13, wherein compiling said first DML statement includes detecting that the JSON schema is defined for the JSON column.

20. The one or more non-transitory storage media of claim 13, wherein compiling said first DML statement includes determining that said first DML statement specifies changes that comply with said JSON schema.

21. The one or more non-transitory storage media of claim 13, the instructions further including instructions that, when executed by one or more computing devices, cause performance of compiling said first DML statement, wherein compiling said first DML statement includes detecting schema-determinable errors either in a path expression or dot notation.

22. The one or more non-transitory storage media of claim 13, wherein said one or more DDL statements include no key value-pairs specifying properties of any fields of said JSON schema.

23. The one or more non-transitory storage media of claim 13, wherein said JSON schema declares a field of said JSON schema as a SQL domain type, wherein the instructions further include instructions that, when executed by one or more computing devices, cause performance of receiving a DDL statement defining said SQL domain type based on a native data type.

24. The one or more non-transitory storage media of claim 13, the instructions further including instructions that, when executed by one or more computing devices, cause performance of:

said DBMS receiving an invocation of a function that requests a description of said JSON schema for said JSON column; and in response to said DBMS receiving an invocation of a function, generating output describing said JSON schema.

* * * * *